United States Patent [19]

Flournoy et al.

[11] 3,769,711
[45] Nov. 6, 1973

[54] ODOMETER
[75] Inventors: Norman E. Flournoy; John P. Kersey, both of Ashland, Va.
[73] Assignee: Texaco Inc., New York, N.Y.
[22] Filed: Sept. 24, 1971
[21] Appl. No.: 183,499

[52] U.S. Cl............... 33/141 G, 33/141 E, 73/49.5
[51] Int. Cl.......................... G01b 3/12, G01m 3/28
[58] Field of Search....................... 33/141 G, 141 R, 33/141 B, 141 E; 73/40.5 R, 49.1, 49.5; 48/193

[56] References Cited
UNITED STATES PATENTS
3,064,127  11/1962  Green et al. ............... 73/40.5 R
2,245,221  6/1941  Nudson et al. .............. 33/141 G
3,495,546  2/1970  Brown et al. ............... 73/40.5 R
3,038,273  6/1972  Luketa ........................ 33/141 R

*Primary Examiner*—Louis R. Prince
*Assistant Examiner*—Steven L. Stephan
*Attorney*—Thomas H. Whaley

[57] ABSTRACT

An odometer for pipeline pig tracking. It has a wheel with sharp pointed teeth of hard material, and an arrangement for applying enough force on the wheel to press the teeth into the pipeline walls.

3 Claims, 6 Drawing Figures

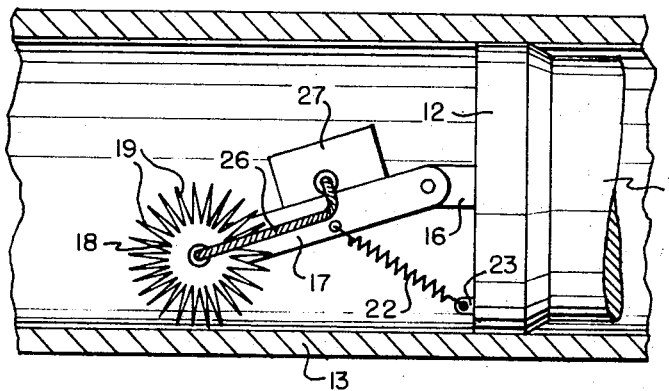
FIG. 1
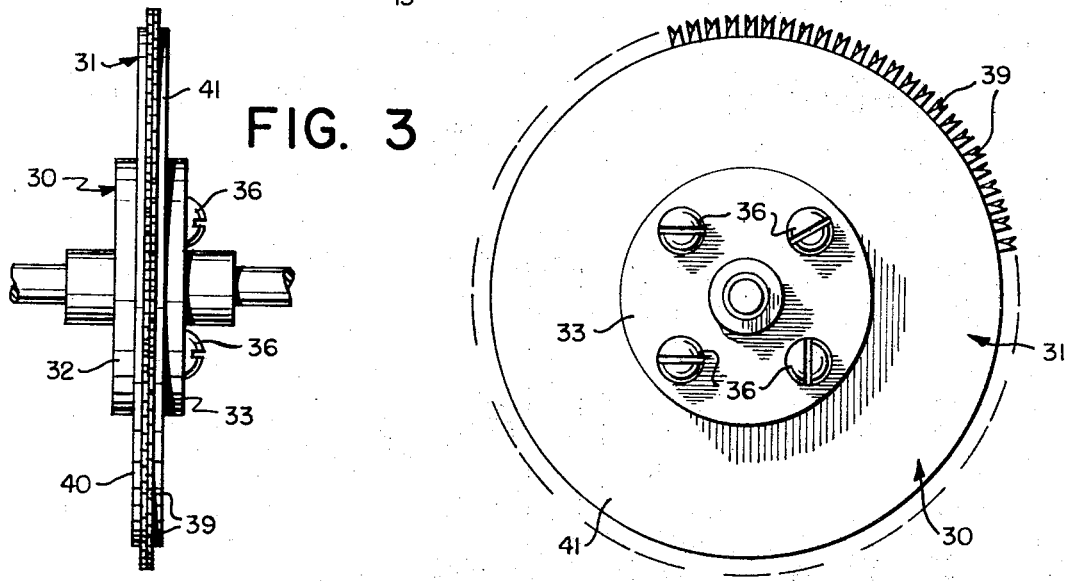
FIG. 3
FIG. 4
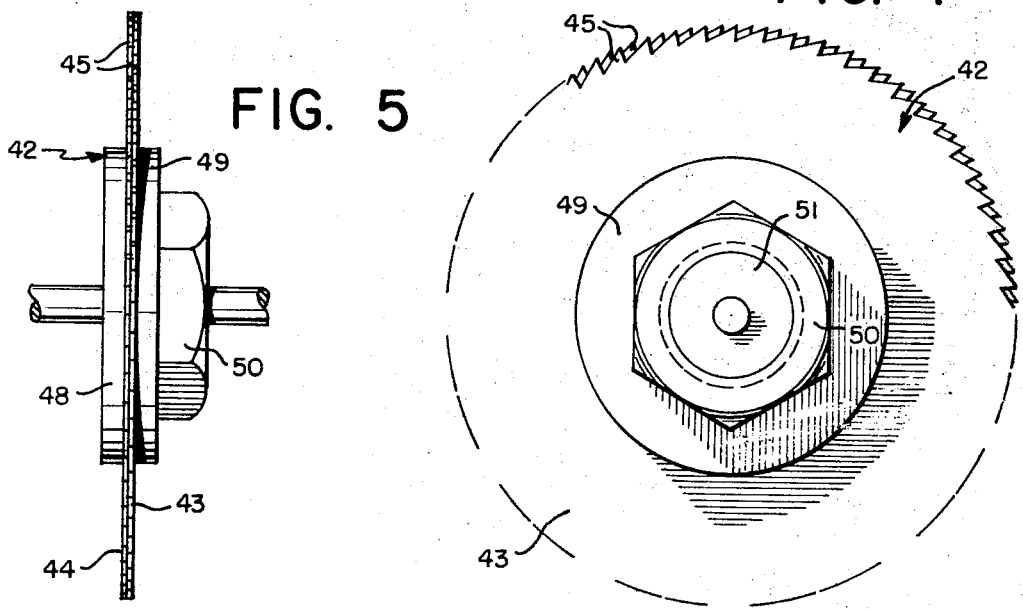
FIG. 5

ODOMETER

BACKGROUND OF THE INVENTION

1. Field of the Invention

This invention concerns pipeline surveying in general, and particularly relates to an improved odometer for making highly accurate distance measurements.

2. Description of the Prior Art

While various pipeline surveying instruments have been developed, there has not heretofore been found a satisfactory odometer for use in determining the distance of the travel of a pipeline "pig" through the pipeline. Apparently, this has been because of the long distances involved, coupled with the inability of odometer wheels (as heretofore provided) to be able to maintain a no-slip tracking relationship with the pipeline walls. Consequently, the use of an odometer in pipeline surveying has not been at all satisfactory.

It is an object of this invention to provide an improved odometer structure that includes a wheel with hardened-material sharp points so as to maintain a no-slip condition at all times.

SUMMARY OF THE INVENTION

Briefly, the invention concerns internal pipeline surveying. And it relates to an odometer for highly accurate distance measurement which comprises a wheel having a plurality of sharp-pointed teeth around the periphery thereof, with a low-friction bearing for supporting said wheel in rotation. It also comprises means for biasing said wheel into contact with the interior surface of said pipeline with sufficient force to cause plastic deformation of said interior surface at the tips of said teeth in contact therewith, without impairing the low-friction bearing of said wheel.

Again, briefly, the invention concerns internal pipeline surveying. And it relates to a combination that comprises a vehicle for being transported through a pipeline by pressure of fluid flow through the line, the said vehicle having a trailing end. It also comprises an odometer wheel for highly accurate tracking of said vehicle. The said wheel comprises a pair of thin steel disks each having a plurality of hardened-steel teeth around the periphery thereof, with said teeth staggered circumferentially to double the number of teeth effective in maintaining no-slip contact with the walls of said pipeline. It also comprises a swivel joint and a bifurcated arm for supporting said wheel, and an idler wheel with means for mounting said idler wheel pivotally about the axis of said odometer wheel. It also comprises a spring for biasing said idler-wheel mounting means toward a transverse position relative to said bifurcated arm in order to hold said odometer wheel in contact with the walls of said pipeline.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings wherein:

FIG. 1 is a cross-sectional view illustrating schematically an odometer attached to a pipeline vehicle;

FIG. 2 is a side elevation illustrating one modification for the structure of an odometer wheel;

FIG. 3 is an end-elevation view of the wheel illustrated in FIG. 2;

FIG. 4 is a side elevation illustrating a different embodiment of an odometer wheel according to the invention;

FIG. 5 is an end elevation illustrating the odometer wheel shown in FIG. 4; and

DESCRIPTION OF THE PREFERRED EMBODIMENTS

Figure 6:
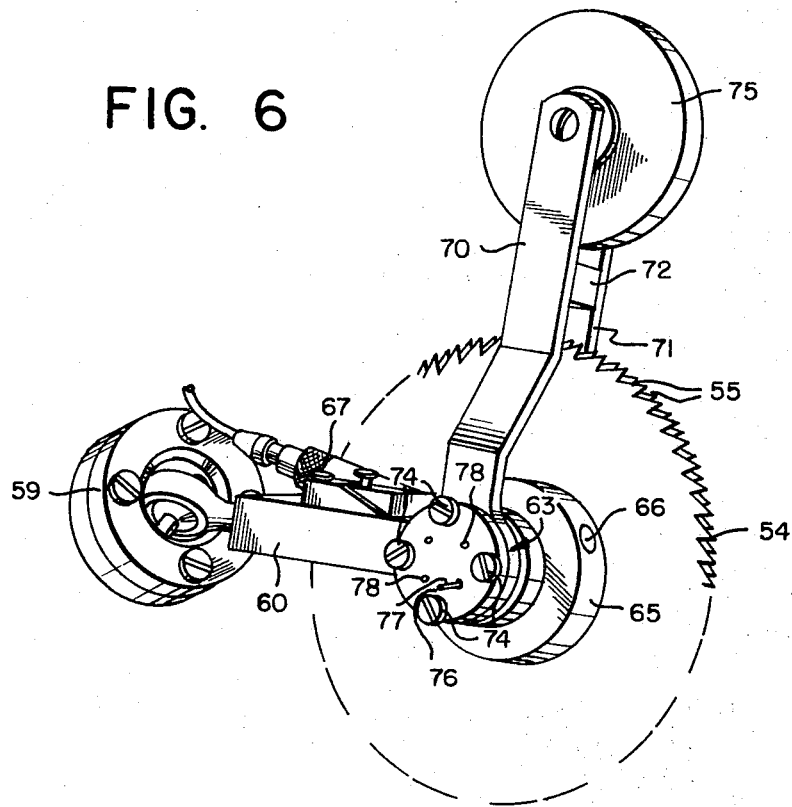
FIG. 6 is a perspective view showing a preferred embodiment of an odometer according to the invention.

In pipeline surveying, particularly where it is desired to locate leaks, it has been found difficult to determine to any degree of accuracy the location of a pipeline "pig" at the time when a leak determination was made. The distances involved are such that the accuracy of odometer tracking has been found unacceptable. However, by means of an odometer structure according to this invention, it has been found feasible to make highly accurate tracking measurements such that the errors involved are on the order of fifty feet for a 25-mile tracking distance.

Referring to FIG. 1, it will be observed that there is schematically shown an odometer that is attached to a trailing end 11 of a surveying vehicle (partly shown) that is constructed in a usual manner, including a flexible flange 12 that contacts the inner walls of a pipeline 13. The vehicle 11 is driven through the pipeline 13 by means of the fluid pressure that is created as the pipeline fluid is pumped through the line. Introduction and removal of the vehicle 11 from the pipeline 13 would be carried out in a conventional manner, e.g., by means of pig traps that are routinely provided for use in connection with scrapers and the like.

The odometer according to this invention is attached centrally, i.e., axially, to the trailing end 11 in any feasible manner. For example, as schematically indicated, it may be attached by means of an axially located stud 16 that has attached to its extremity a pivotally mounted arm 17 which, in turn, carries an odometer wheel 18 rotatably mounted at the extremity thereof. The wheel 18 is supported by low-friction bearings (not shown), and it has a plurality of sharp-pointed teeth 19 thereon. There is a spring 22 that extends between the arm 17 and a lug 23 that is located on the trailing end of the vehicle 11. This spring is under tension and acts to bias the wheel 18 into contact with the walls of pipeline 13 with sufficient force to insure rolling without slippage between the wheel 18 and pipeline 13, as the vehicle moves therethrough. The particular structure for some embodiments of wheel 18 is shown and described in more detail hereafter in relation to FIGS. 2–5 of the drawings.

In order to have the wheel 18 act as an odometer, there is a cable 26 that connects the wheel 18 to an indicator and/or recording device 27 that is schematically indicated as being carried by the arm 17. It will be appreciated that various types of apparatus may be employed in keeping track of the number of revolutions of wheel 18, as it tracks the movements of the vehicle. As will appear below, a preferred arrangement makes use of an electrical system that employs a magnetic pulse which is created once for each revolution of the wheel 18. These pulses are electrically transmitted into an instrument (not shown) that is carried by the vehicle.

FIGS. 2 and 3 illustrate one modification of the structure for an odometer wheel. There is a wheel 30 that is made up of a thin disk 31 which is clamped between two hubs 32 and 33. These hubs are held together in any feasible manner, e.g., by employing four screws 36 in the manner illustrated. Around the periphery of the disk 31, there are a plurality of tungsten carbide teeth 39. These are made up by cementing two rows of a plurality of carbide reamer blanks between two side plates 40 and 41. Each tooth may be formed with a curved surface meeting a straight radial surface to provide a sharp point that is extremely hard at the tip. A specific example of the tooth dimensions for a 3⅜ inch diameter wheel is as follows: one thirty-second of an inch thick by one-sixteenth of an inch wide by one-half inch long, with a one-quarter inch radius curve. There being ninety teeth in each row to make a total of 180 teeth.

FIGS. 4 and 5 illustrate another embodiment of an odometer wheel according to the invention. In this case, there is a wheel 42 that is made up of a pair of thin steel disks 43 and 44 which are clamped together with teeth 45 staggered circumferentially, as illustrated. These teeth 45 are hardened steel and may be formed like steel saw blades with high-speed steel hollow-ground pointed teeth.

The disks 43 and 44 are clamped together in any feasible manner, such as by being held between a rear flange 48 and a front flange 49, with a nut 50 threaded onto a hub 51 that extends through from the flange 48.

In this case, a specific example of the dimensions for a four-inch diameter wheel is as follows: each disk is one-thirty-second of an inch thick with sixty teeth making a total of one-hundred-and-twenty teeth.

FIG. 6 illustrates a preferred modification that employs an odometer wheel 54 which, in this case, is like the wheel 42 of the FIGS. 4 and 5 modification with respect to the toothed disks thereof. Thus, wheel 54 has two staggered rows of sharp teeth 55 that will be pressed into sufficient contact with the walls of a pipeline to create some plastic deformation of the metal or other material of said pipeline walls.

The wheel 54 is pivotally supported from a swivel joint 59 having a ring-like base. It includes a full swivel structure to permit freedom of rotation about both axes at right angles to one another. This swivel joint 59 is adapted to be attached to the trailing end of a vehicle, axially thereof, in a manner similar to that schematically indicated in FIG. 1. Thus, there is a bifurcated arm 60 which has its unitary end attached to the swivel joint 59. The other ends extend out to support a pair of hubs 63 that, in turn, support low-friction bearings for the wheel 54.

The wheel 54 has a relatively thick hub 65 that contains therein a permanent magnet insert 66 which will provide an electrical signal each time it rotates past the end of an electromagnetic pickup unit 67. Pickup 67 is mounted on one side of the wheel 54 and supported by the arm 60 so that each time insert 66 passes the tip of the unit 67 an electrical pulse signal will be generated. This provides signals for counting the number of revolutions of the wheel 54.

Attached to the hubs 63, for coaxial rotation to a limited extent about the axis of wheel 54, are two arms 70 and 71 that are attached together by a cross member 72. At the extremity of arms 70 and 71, there is an idler wheel 75 supported for free rotation. This wheel 75 is preferably constructed of a plastic material to permit some shock absorption. The idler wheel 75 and its supporting arms 70 and 71 are mounted with a spring bias to hold them in the illustrated position relative to the arm 60. This position is substantially transverse to the arm 60, which arm supports the wheel 54.

The arms 70 and 71 are rotatable clockwise (as viewed in FIG. 6) against a spring bias. Consequently, these arms 70, 71 and the idler wheel 75 will swing toward alignment with arm 60 while holding the odometer wheel 54 against one side of the inner walls of a pipeline. Such swinging from the transverse position will be caused by the inner walls of the pipeline that will have an inside diameter less than the maximum spread of the idler wheel 75 and the odometer wheel 54.

It will be appreciated that the spring bias for providing the foregoing action might take verious forms. However, in the arrangement illustrated in FIG. 6, there is a coiled spring located within the hub 63 underneath a plate 76. The plate 76 is held in place by four screws 74. The spring has an end 77 that extends out through one of four holes 78 in the plate 76 so that the amount of force applied by the spring may be adjusted.

It will be appreciated that the combination illustrated in FIG. 6 provides an odometer that is very flexible while, at the same time, it produces a highly accurate measurement of the distance traversed by a vehicle to which the odometer is attached. Actual tests using an odometer wheel like that illustrated in FIGS. 2 and 3 showed that without recalibration, test runs covering a total distance of over 100 miles produced odometer errors between 0.003 miles and 0.011 miles (about 16 to 58 feet) for each 25 mile run.

While particular embodiments of the invention have been described above in considerable detail, this is not to be taken as in any way limiting the invention, but merely as being descriptive thereof.

We claim:

1. In internal pipeline surveying, a combination comprising
   a vehicle having an axis and being adapted for being transported through a pipeline coaxially therewith by pressure of fluid flow through the line,
   said vehicle having a trailing end,
   an odometer wheel for highly accurate linear distance tracking of said vehicle through said pipeline,
   said wheel comprising a pair of thin steel disks each having a plurality of hardened-steel teeth around the periphery thereof with said teeth on each disk staggered circumferentially relative to the other disk to double the number of teeth effective in maintaining no-slip contact with the walls of said pipeline,
   means located axially of and on said trailing end of the vehicle for mounting said wheel; and
   spring means for biasing said wheel radially outward relative to said axis to press said wheel teeth into contact with a first wall of said pipeline with sufficient force to cause at least some plastic deformation of the material of said walls.

2. The invention according to claim 1, wherein said axially located mounting means comprises a universal swivel joint having a bifurcated arm attached thereto for supporting said odometer wheel, and wherein said spring means comprises
   an idler wheel,
   means for mounting said idler wheel pivotally about the axis of said odometer wheel, and a spring for biasing said idler-wheel mounting means so as to bias said idler wheel relative to said bifurcated arm into engagement with a wall of said pipeline opposite said first wall in order to hold said odometer wheel in contact with said first wall of the pipeline.

3. The invention according to claim 2, wherein said biasing spring is adjustable to set the biasing force at different levels.

* * * * *